Patented Sept. 25, 1951

2,569,403

UNITED STATES PATENT OFFICE 2,569,403

SOLUBLE CALCIUM SALTS

Elmer William Cook, New York, N. Y., and Philip Hotchkiss Moss, Greenwich, Conn., assignors to American Cyanamid Company, New York, N. Y., a corporation of Maine No Drawing. Application July 13, 1946,
Serial No. 683,431

8 Claims. (Cl. 167—68)

This invention relates to therapeutically useful compositions containing available calcium, which are particularly suitable for parenteral injection.

Calcium deficiency has long been recognized as a cause of many disorders in both animals and humans. Many calcium preparations have been made in an attempt to obtain materials which will supply calcium to overcome this deficiency. The composition which is used must be one in which the calcium is readily available for use in the body and which does not have undesirable toxic effects and which does not produce necrosis and which is stable on storage at low temperature. A great many compounds such as calcium gluconate, calcium lactate, and others have been used. Calcium gluconate has been used most frequently, but calcium gluconate is only soluble at room temperature to the extent of about 3%, and only about a tenth of the material is actually calcium ion. This leaves the alternative of either preparing super-saturated solutions which have been stabilized in some manner, or using objectionably large quantities of solution.

In our solution the calcium compounds as prepared are basically stable and soluble, so that the disadvantages induced by attempting to stabilize a super-saturated solution are avoided.

Boric acid, or compounds such as boron oxide, boric acid anhydride, etc. which evolve boric acid in solution, form a complex with polyhydroxy alcohols, such as mannitol, which have in their structure two hydroxyl groups on adjacent asymmetric carbon atoms which may be regarded as cis to each other. Such alcohols, and related compounds, which contain at least two asymmetric carbon atoms with a hydroxy group on the same side of each, that is in the cis position, will be referred to as cis polyhydroxides. The term cis polyhydroxide alcohols is intended to refer to compounds possessing such a cis polyhydroxide structure and additionally containing only other alcohol groups as substituents. This cis glycol boric acid complex readily dissolves calcium hydroxide. The solution is most suitable for parenteral use if sufficient calcium hydroxide has been added to give a solution which is approximately neutral. This solution may be used per se for parenteral injection or may be used to dissolve or assist in the solution of other compounds such as calcium gluconate or calcium alpha-hydroxy-isobutyrate, or related products such as are described in Patents Nos. 2,266,992 and 2,266,993.

A solution may be prepared in accordance with this invention which contains the calcium equivalent of a 50% calcium gluconate solution, the solution being evaluated on a weight per volume basis. This is the equivalent of approximately 45 mgs. per cc. of the calcium ion. Such a solution is stable over prolonged periods at room temperature and may be used parenterally. However, from the standpoint of convenience of use, wherein it is desired to have a convenient volume containing the required calcium dosage, and from the standpoint of the actual concentrations of solutions injected, it is generally more desirable to use solutions containing in the neighborhood of 18 mgs. per cc. of calcium ion, such solution being the calcium equivalent of a 20% solution of calcium gluconate; altho solutions rated at from 5% to 30% are of value.

The exact mechanism of the solubilization in the complex formation is not known. It is not possible to postulate a completely adequate theoretical explanation for the actions of the solutions prepared in accordance with my invention, nor is it desirable to confine the scope of invention to a particular theory. The solutions as prepared in accordance with my invention fill a need of long standing and are satisfactory for use by a doctor on humans and by a veterinary on animals.

Following are specific examples illustrating certain modifications of our invention which, however, is not restricted to the specific details as shown:

Example 1

To 36 grams (0.2 mol) of mannitol, dissolved in 180 cc. of warm water is added 12.4 grams (0.2 mol) of boric acid. 7.4 grams (0.1 mol) of calcium hydroxide is dissolved in the solution by stirring. A nearly clear solution is readily formed and any small residue may be removed by filtration, giving a clear, stable solution with a pH of about 6.5. The small amount of cloudiness or residue is believed to be calcium carbonate present in the lime and also due to the presence of carbon dioxide and other impurities in the water and reagents. It is desirable that the lime be free from iron compounds, etc. to avoid the formation of color in the solution.

Example 2

A clear solution is similarly formed from 8.5 grams of dextrose, 23.6 grams of lactic acid, 13.8 grams of boric acid and 17 grams of calcium hydroxide in sufficient water to give 500 cc. of solution. The solution is clear, nearly neutral and stable.

Example 3

A solution is formed following the methods of Example 1, which contains 52 grams calcium gluconate, 22 grams mannitol, 14.4 grams boric acid, and 8.8 grams calcium hydroxide in sufficient water to form 500 grams of solution. The filtered clear solution is stable on standing at room temperature for prolonged times, and nearly neutral with a pH of about 6.5.

Example 4

When calcium hydroxide is added to a 20% solution of calcium alpha-hydroxyisobutyrate, containing 4% of boric acid, no appreciable solution takes place, but if 225 grams of dextrose be added to 1500 cc. of the solution, approximately 22.4 grams of calcium hydroxide will be dissolved therein, to result in a clear neutral solution. Solutions so prepared may be sterilized and used parenterally.

Solutions may be prepared containing up to the calcium ion equivalent of a 50% calcium gluconate solution, by using increased concentrations in similar proportions. From the standpoint of convenience though, a 20% solution is normally most convenient for parenteral use.

Example 5

A clear, stable solution may be prepared by dissolving 180 grams (1 mol) of dextrose, 62 grams (1 mol) of boric acid, 215 grams (0.5 mol) of calcium gluconate and 38 grams (0.5 mol) of calcium hydroxide in 1655 grams of water, and filtering. The solution is formed readily and quickly, and is stable over long periods.

Example 6

A clear, stable solution may be prepared using fructose instead of dextrose, as described in Example 5.

In the above examples, due allowance must be made if hydrated forms of the materials are used. The proportions given are for the anhydrous forms.

Similar solutions may be prepared from calcium gluconate, sorbitol, boric acid and calcium hydroxide; and from lactic acid, mannitol, boric acid, and calcium hydroxide. Excellent solutions are obtained from any of the polyhydroxic alcohols or sugars which have two cis hydroxyls in their structure available for complex formation in aqueous solution. The material seems to solubilize rather than stabilize the calcium gluconate or other calcium materials which may be present, as the solution is stable even in the presence of seed crystals.

Polyhydroxy compounds such as glycerin, which do not have a cis polyhydroxide structure, do not form the stable calcium solutions.

Among the polyhydric alcohols which may be used are mannitol, sorbitol, dextrose, etc. The compound must be non-toxic, and should be available as a fuel in the body.

When the boric acid-cis glycol complex is used to solubilize other calcium compounds, as calcium gluconate or calcium alpha-hydroxyisobutyrate, sufficient calcium as the hydroxide or its equivalent, should be added to give an approximately neutral solution, a pH of about 6 to 7.5 being preferred; values outside this range may be used, but less damage to tissue usually results from a nearer neutral solution.

The material as prepared may be evaporated to dryness and reconstituted as an injectable solution by the addition of water.

We claim:

1. A stable, aqueous composition for therapeutic use comprising an aqueous solution of a calcium salt of a boric acid-polyhydroxy alkane complex, said polyhydroxy alkane having a structure such that two of its hydroxyl groups are cis to each other, said solution having a pH within the range of about 6 to 7.5.

2. A calcium-containing aqueous solution comprising essentially the complex resulting from the reaction of approximately equimolecular proportions of boric acid and a polyhydroxy alkane having at least two of its hydroxyl groups cis to each other, in water, said solution having a pH between about 6 and 7.5.

3. A stable, aqueous, therapeutic solution containing from 5 to 45 milligrams per cc. of calcium ions present as the calcium salts of boric acid-polyhydroxy alkane complexes, said polyhydroxy alkane having at least two hydroxyl groups that are cis to each other and as the calcium salts solubilized by said complex, said solution having a pH of within the range of about 6 to 7.5.

4. A stable, injectable, aqueous, therapeutic solution comprising a calcium salt of a boric acid-polyhydroxy alkane complex, said polyhydroxy alkane having a structure such that two of its hydroxyl groups are cis to each other, and calcium alpha-hydroxy-isobutyrate, said solution having a pH between about 6 and 7.5.

5. A stable, aqueous, therapeutic calcium solution consisting essentially of water and the calcium salt of a boric acid-mannitol complex, said solution having a pH of within the range of about 6 to 7.5.

6. A stable, aqueous, therapeutic calcium solution consisting essentially of water and the calcium salt of a boric acid-sorbitol complex, said solution having a pH of within the range of about 6 to 7.5.

7. A stable, aqueous, therapeutic calcium-containing solution consisting essentially of approximately 22% of a calcium salt of a complex formed from equimolecular proportions of boric acid and mannitol dissolved in water, said solution having a pH of about 6.5.

8. An aqueous, therapeutic solution consisting essentially of about 10.4% of calcium gluconate and 8.2% of the calcium salt of the complex formed by mixing equimolecular proportions of boric acid and mannitol, and water, said solution having a pH of within the range of about 6 to 7.5.

ELMER WILLIAM COOK.
PHILIP HOTCHKISS MOSS.

REFERENCES CITED

The following references are of record in the file of this patent:

UNITED STATES PATENTS

| Number | Name | Date |
| --- | --- | --- |
| 1,649,269 | Scoyoc | Nov. 15, 1927 |
| 1,865,141 | Rothlin | June 28, 1932 |
| 2,007,786 | Austin | July 9, 1935 |
| 2,266,992 | Roblin | Dec. 23, 1941 |
| 2,382,546 | Curtis | Aug. 14, 1945 |

OTHER REFERENCES

Karrer: Organic Chemistry, 2nd English edition, 1946, Elsevier Pub. Co., N. Y., page 326. (Copy in Div. 43.)